United States Patent [19]

Fiore et al.

[11] 4,156,315

[45] May 29, 1979

[54] MODULAR EDUCATIONAL RESPONSE UNIT

[76] Inventors: John J. Fiore, 103 Gedney St., Nyack, N.Y. 10960; Mary Parris, 24 Beacon Hill Rd., Ardsley, N.Y. 10502

[21] Appl. No.: 864,634

[22] Filed: Dec. 27, 1977

[51] Int. Cl.² ............................................. G09B 3/06
[52] U.S. Cl. ..................................... 35/8 R; 35/48 R; 35/60
[58] Field of Search ................. 35/8 R, 9 R, 9 B, 9 F, 35/48 R, 60, 74, 75

[56] References Cited

U.S. PATENT DOCUMENTS

| | | | |
|---|---|---|---|
| 468,475 | 2/1892 | Sapp | 35/75 |
| 1,270,668 | 6/1918 | Spoor et al. | 35/74 |
| 2,200,206 | 5/1940 | Myers | 35/9 B |
| 3,077,038 | 2/1963 | Williams et al. | 35/9 B |
| 3,134,177 | 5/1964 | Rozmus | 35/8 R |
| 3,200,513 | 8/1965 | Blyth et al. | 35/9 F |
| 3,248,809 | 5/1966 | Stifano, Jr. | 35/75 |
| 3,286,372 | 11/1966 | Williams et al. | 35/9 B |
| 3,304,627 | 2/1967 | Cella | 35/8 R |
| 3,591,930 | 7/1971 | Little et al. | 35/48 R X |

*Primary Examiner*—William H. Grieb

[57] ABSTRACT

A modular device for use in educational institutions comprising a housing having opposed, spaced, parallel walls or panels. The first panel which faces the student, has a rectangular cutout area within which is mounted a generally disc-shaped member, rotatable about an axial pin which is secured at both ends to said rectangular cutout area. The disc-shaped member bears two or more response tabs on its viewing surface which are registerable with a viewing area cut out in the other panel which faces the instructor. The first panel also includes a horizontal slot, and a lever is mounted in said slot, which lever is connected to a shutter means to open and close the viewing area in the second panel. A tally counter may be optionally installed on the first panel to count the number of questions to which responses have been provided.

17 Claims, 12 Drawing Figures

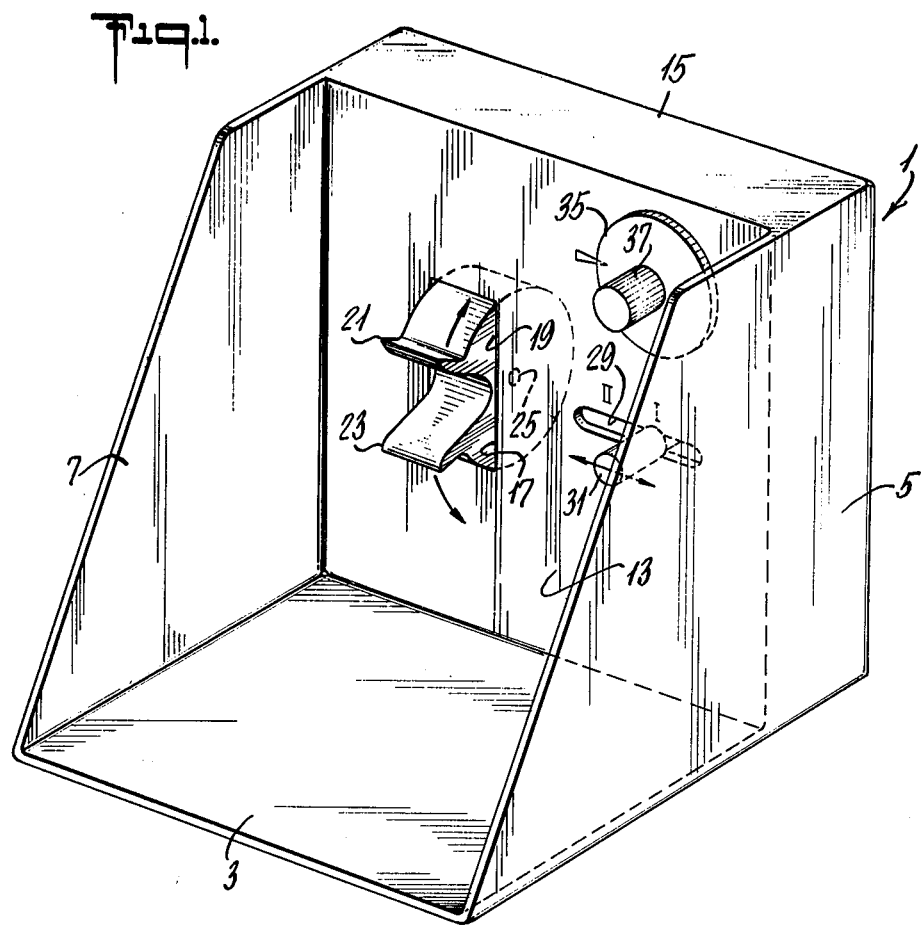
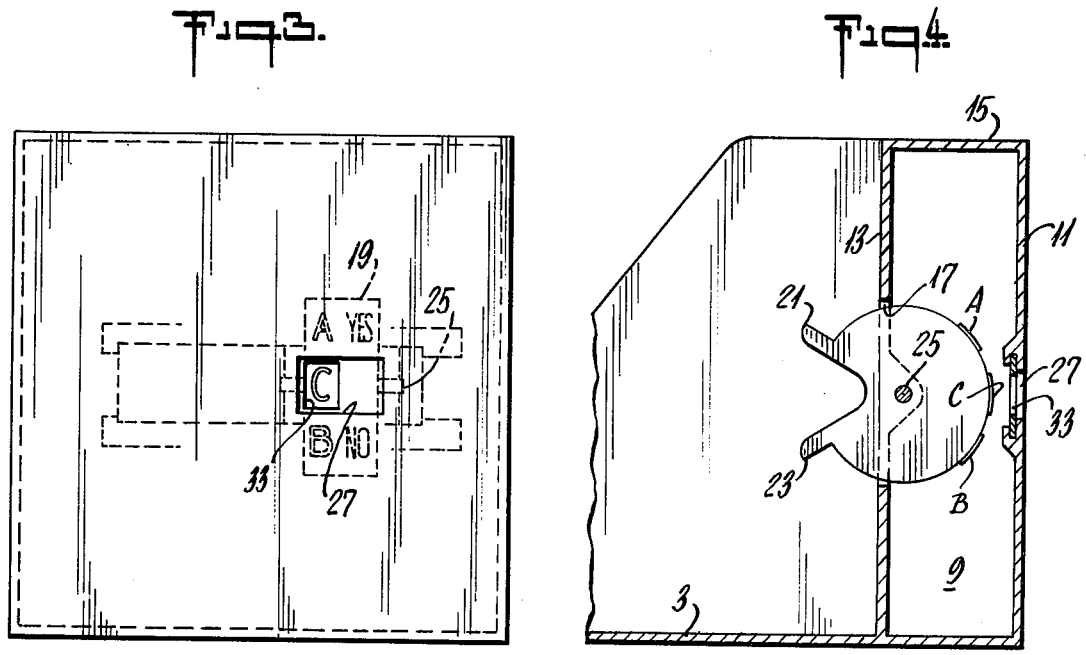

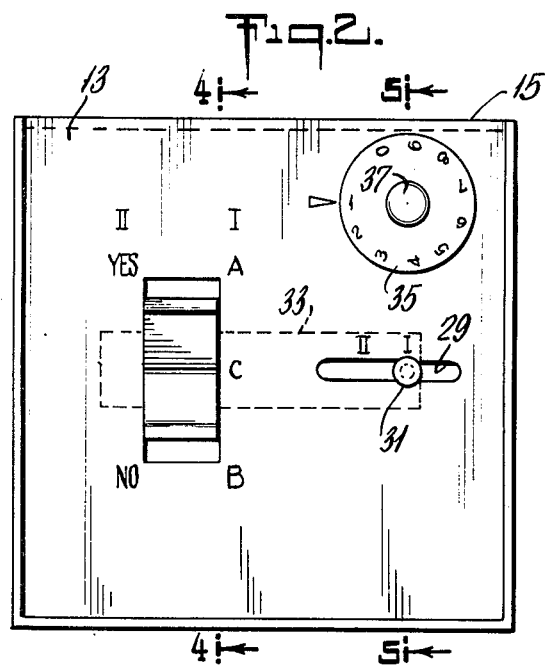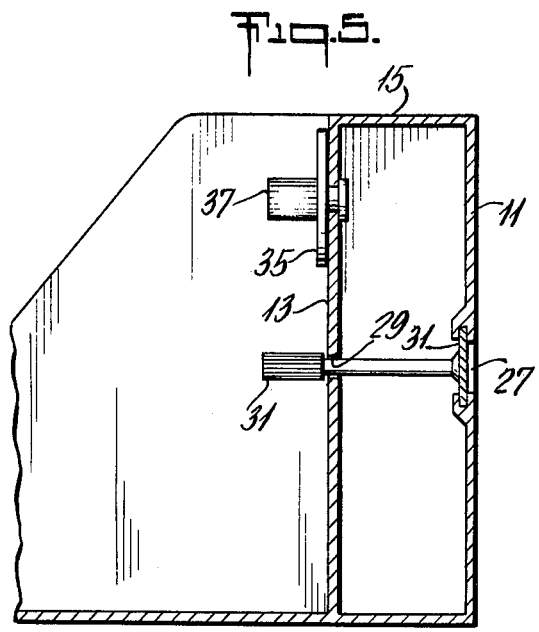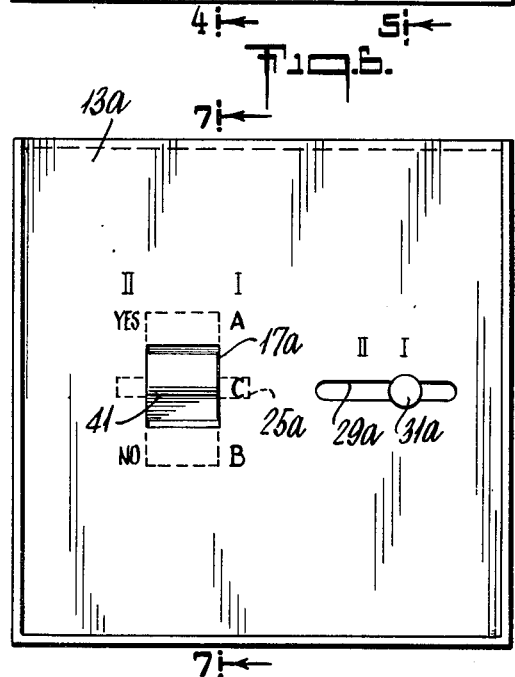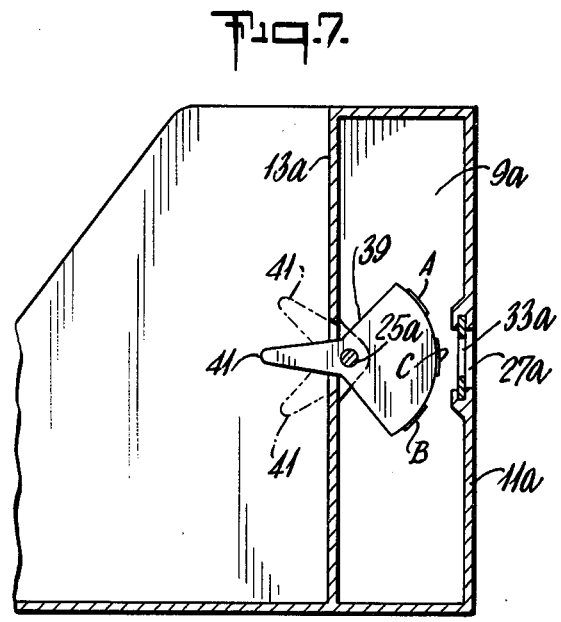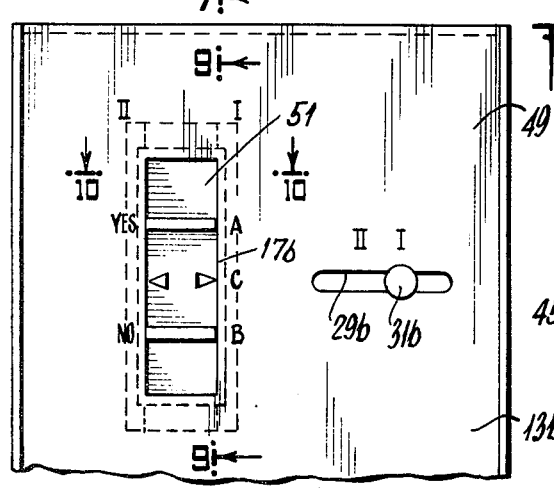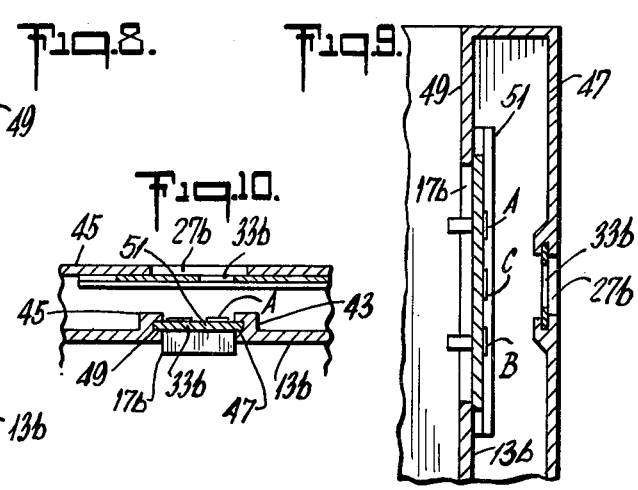

MODULAR EDUCATIONAL RESPONSE UNIT

Other embodiments are contemplated and are described in the detailed description of the invention.

BACKGROUND OF THE INVENTION

1. Field of Invention

This invention relates to a device for educational and other purposes and is particularly related to a modular unit for use in educational institutions. More specifically, the present invention is concerned with a modular educational response unit for use by students in classrooms to respond to questions promptly and confidentially.

2. The Prior Art

Various educational and testing machines have already been described in the prior art. Examples of such devices may be found in U.S. Pat. Nos. 2,200,206 (Myers); 3,077,038 (Williams et al); 3,134,177 (Rozmus); 3,200,513 (Blyth et al); 3,286,372 Williams et al and 3,591,930 (Little). While these patents are by no means exclusive, they do represent the variety of educational and instructional devices which have heretofore been described and proposed for one purpose or another.

Thus, for example, Myers discloses an educational device to teach spelling; Williams et al's U.S. Pat. No. 3,077,038 describe a device by which students may be provided with individual instruction and testing; Blyth et al are concerned with an educational training device wherein a group of questions and answer cards are positioned within a housing and an answer sheet is also positioned in the same housing. The question cards are indexed one at a time into a viewing position and a space for an answer, corresponding to the indexed question, is simultaneously positioned at an accessible location. After reading the question, the student writes the answers in the corresponding space and actuates the indexing mechanism to expose his answer to the question; and Little describes a teaching machine which is automatic, electrically controlled and driven by a motor.

The educational devices which are described and illustrated in the aforementioned representative patents, however, have rather specific and limited use. It is a matter of classroom experience that teachers frequently propound several questions to which they seek an immediate response from the students. Some of these questions are susceptible of "yes" or "no" answer while others are of the "multiple choice" category. Solicitation of written responses can be tedious and time-consuming and, therefore, impractical. On the other hand, teachers often seek individual responses promptly and simultaneously. The educational devices which have heretofore been described in the prior art have not, so far as it is known, addressed themselves to this problem.

Accordingly, it is an object of the invention to provide a device which can be used to give a visual indication of a response to a question or questions.

It is a further object of this invention to provide such a device which is modular and simple to use in various classrooms and other educational institutions, particularly by students of tender years.

It is another object of this invention to provide a modular response unit which can be operated mechanically and whereby the students can respond to questions promptly and confidentially, i.e., out of the views of the other students.

It is still another object of this invention to provide such a modular response unit which is relatively simple to construct, portable and which can be conveniently used by students of all ages with relative ease and safety.

The foregoing and other objects and features of this invention will be more fully comprehended from the following detailed description of its several embodiments as well as from the accompanying drawings which form a part of this application.

BRIEF DESCRIPTION OF THE DRAWINGS

FIG. 1 is a perspective view of an educational modular response unit which is constructed in accordance with one embodiment of this invention;

FIG. 2 is a front elevational view (as viewed by the student) of the apparatus shown in FIG. 1;

FIG. 3 is a front elevational view as viewed from the instructor's side;

FIG. 4 is a sectional view taken along the line 4—4 of FIG. 2;

FIG. 5 is a sectional view taken along the line 5—5 of FIG. 2.

FIG. 6 is a front elevational view (from the student side) of a different embodiment of the invention;

FIG. 7 is a sectional view taken along the line 7—7 of FIG. 6;

FIG. 8 is a front elevational view (from the student side) of another embodiment of the invention;

FIG. 9 is a sectional view taken along the line 9—9 of FIG. 8;

FIG. 10 is another sectional view of FIG. 8 taken along the line 10—10 thereof,

DETAILED DESCRIPTION OF THE INVENTION

Figure 11:
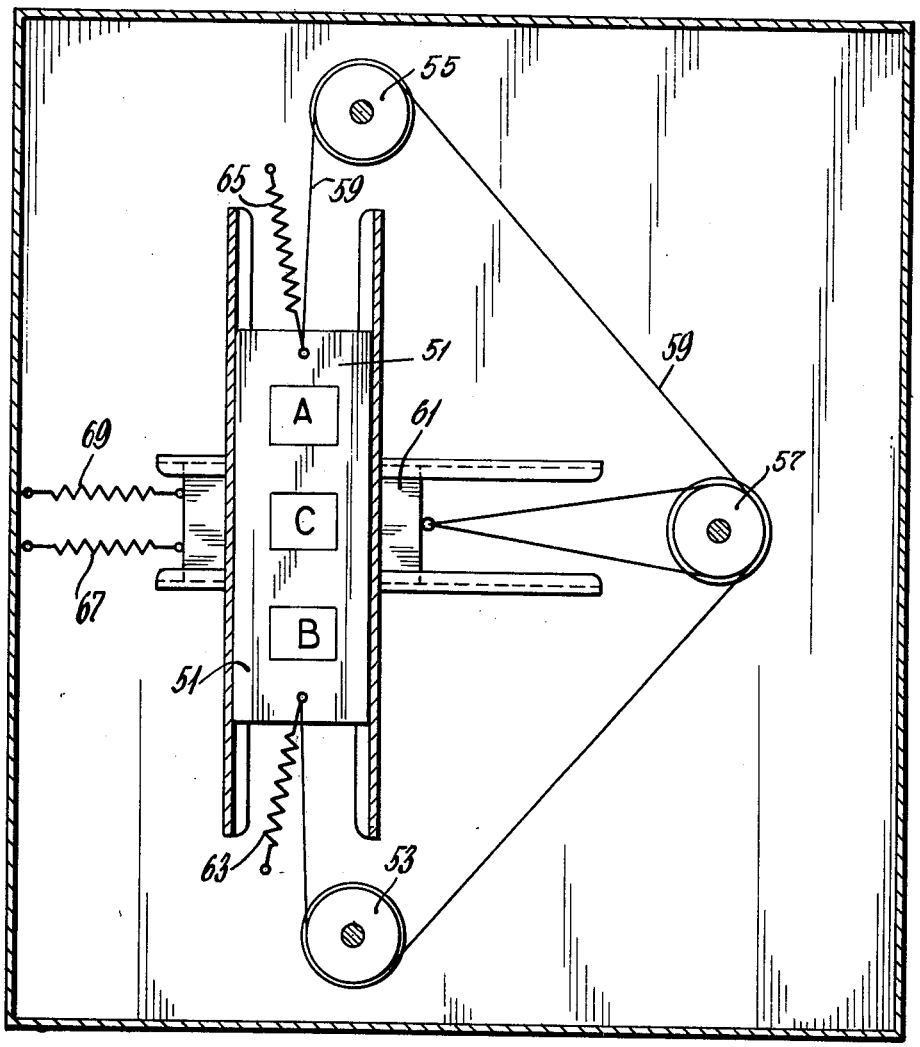
FIG. 11 is a view similar to FIG. 8 but illustrating another embodiment of this invention.

In accordance with this invention there is provided a modular unit for educational purposes which is characterized by its novel and unique construction and simplicity of operation. The device of this invention can be used by students in classrooms, or by others in various educational institutions to give a visual indication of their response to questions propounded to them by an instructor. These responses may be revealed promptly, simultaneously and out of view of the neighboring students. It is relatively simple to construct in various convenient and portable sizes. It may be generally fabricated from plastic, although they may also be made from metal or cardboard for that matter. Preferably, it does not include, nor does it require any electrical parts and hence it can even be used in places where electricity is either unavailable or inaccessible. This feature is significant from safety standpoint when the device is used in classrooms by students of tender years. Moreover, since no electrical outlets are required for their operation, as many units may be used simultaneously as may be needed and each student may be furnished with one unit.

Referring now to the drawings wherein like reference numerals are employed to designate like parts where possible, and with particular reference first to FIGS. 1–4, there is shown in FIG. 1 a modular response unit generally designated as 1 comprising a relatively flat base 3, a pair of upright, opposed, generally parallel side walls or panels 5 and 7 attached to both ends of said base 3. The side walls 5 and 7 may be slightly tapered at their respective rear ends, i.e., the ends nearer to the student, as shown in FIG. 1.

The device shown in FIG. 1 further comprises a housing or a compartment 9 at its forward section. This compartment is defined by a front upright wall or panel 11, a generally parallel upright wall 13 in spaced relation to the panel 11, and a relatively flat roof or top panel 15. The panels 11 and 13, top panels 15, together with the base 3 and side panels 5 and 7 complete the construction of and define the compartment 9.

The side panel 13 has a generally rectangular cutout section 17 within which is mounted a rotatable, generally disc-shaped member 19, a portion of which is cut out and formed into a pair of integral projections or fingers 21 and 23. The disc-shaped member 19 is rotatable about an axial pin 25 which is secured to the panel 13 at both ends of said cutout section 17.

Two or more indexing tags or response labels marked "yes" or "no", or as shown in FIG. 1, marked A, C and B are adhesively attached on the edge of the disc-shaped member (see FIGS. 3 and 4). Either labelling systems may be employed to signal the students' response depending on whether the questions propounded elicit yes or no answers or a single response to a multiple choice question. Alternatively these labels may be printed, written or otherwise displayed on the edge of the disc-shaped member.

The side panel 11 comprises a viewing area 27 for viewing the students' response. Also, as shown in FIGS. 1 and 2, the side panel 13 includes a generally horizontal slot 29, a lever or some other actuating means 31 slideable attached to a shutter means 33 to close or open the viewing area 27. Both ends of the slot 29 may be conveniently marked with the designations "open" and "close" to correspond, respectively to the fully open and fully closed viewing area.

In use, when a question is posed, and assuming that the question is susceptible of a "yes" or "no" response, the viewing area 27 is first closed by pushing the lever 31 to the fully closed position, i.e., all the way to the left of the slot 29. The student then selects his response by pushing the finger 21 all the way up to the "yes" position, or by pushing the finger 23 all the way down to the "no" position. Thereafter, he pushes the lever 31 all the way to the right thus exposing his answer to the instructor through the viewing area 27. In case of multiple choice questions, the student simply rotates the disc-shaped member to the proper position to signal his response. For example, if the question posed calls for one correct answer out of possible three, the student may signal his answer by pushing said fingers to the A or B position, or to the C position, midway in the rectangular cutout section 17 as shown in FIG. 2.

For convenience in tallying the number of questions which have been answered, a digital counter 35 may be mounted on the side panel 13. A knob 37 turns the counter clockwise to indicate the number of questions which have been answered as indicated by the arrow pointing to the numeral 1 in FIG. 2.

Referring now to FIGS. 6 and 7 which relate to a different embodiment of the invention, the basic structure of the modular response unit is similar to the embodiment illustrated in FIG. 1. As in the previous embodiment it comprises a compartment 9a having two opposed parallel walls or side panels 11a and 13a. The side panel 13a comprises a genrally rectangular cutout section 17a in which there is mounted a generally hemispherical member 39 having an integral stem or lever 41 which may be pushed up or down to the phantom, toggle-type positions shown in FIG. 7. The hemispherical member 39 is rotatable about an axial pin 25a and bears, on its surface, index or response labels which are registerable with the viewing area 27a in the side panel 11a.

As in the previous embodiment, the side panel 13a comprises a horizontally disposed slot 29a and a lever member 31a connected to a shutter 33a (connection not shown) for closing and opening the viewing area 27a.

In order to signal the response to a question which calls for a "yes" or "no" answer, for example, the shutter is actuated to its fully closed position, the integral toggle lever 41 is either depressed all the way down or pushed all the way up, and the lever 31a is pushed to the fully open position.

As in the previous embodiment, a tally counter (not shown) may be mounted on the side panel 13a if desired.

A third and a different embodiment of this invention contemplates a modular response unit as illustrated in FIG. 1, but wherein a different indicator means is employed. In accordance with this embodiment shown in FIGS. 8–10, the side panel 13b has a generally rectangular cutout area 17b as in the two previous embodiments. A pair of opposed, parallel guide bars 43 and 45 are secured at the longitudinal sides of the cutout area 17b and the interior face of each guide bar is grooved to form the channels 47 and 49. A relatively flat indicator bar 51 is slideably retained between said guide bars and slide through said channels (see FIGS. 9 dnd 10). Th viewing surface of the indicator bar 51 comprises index tags or labels designated as "yes" or "no" or imprinted with the letters A, B and C as the case may be, or it could be a reset position for such tags or labels.

The side panel 13b also includes a horizontally disposed slot 29b and lever 31b which is connected to the shutter 33b (connection not shown) for closing and opening the viewing area 27b.

In order to indicate the response to a question, the lever 31b is pushed all the way to the right to fully open the viewing area 27b, and the guide bar 51 is pushed through said channels to a position corresponding to the desired answer.

In the embodiments illustrated in FIGS. 1–10, the shutter means operates independently from the disc-shaped member 19, the hemispherical member 39 or the slide bar 51. Accordingly, FIG. 11 serves to illustrate that, for example, in the embodiment shown in FIGS. 8, 9 and 10, the viewing area may be opened or closed simultaneously with the operation of the guide bar 51. Thus, in the embodiment shown in FIG. 11, the device is additionally equipped with pulleys 53 and 55 and a double pulley 57 which can be conveniently mounted inside the compartment 9. A cord or string 59 is trained over the pulleys 53, 55 and 57 and a section thereof is looped around the double pulley 57 and secured to the shutter 61 as shown in FIG. 11. The terminal ends of the cord 59 are secured to the respective ends of the spring elements 63 and 65, the other ends of the spring elements 63 and 65 being securely fixed inside the compartment 9, as shown in FIG. 11.

Tension springs 67 and 69 are secured between the other end of the shutter 61 and the inside wall of the panel 13 for releasing the shutter to a closed position as will hereinafter be described.

In operation, when the selector guide bar 51 is depressed, spring element 65 will be stretched pulling on the cord 59 through the pulleys and retracting shutter 61 which remains retracted as long as the spring element 65 is in depressed position. This opens the viewing area for viewing any of the labelled responses A or B, as the case may be. If more than two responses are called for, a second slide bar may be used with its associated assembly as hereinbefore described.

When the selector guide bar 51 is released, spring element 65 is reset to its original position. Because of the counteraction of spring element 63, the tension on the cord 59 is released, allowing tension springs 67 and 69 to return the shutter 61 to its original closed position.

When the selector guide bar 51 is raised, cord 59 will be pulled in opposite direction and the shutter 61 will be restricted, and remain open to display the indicia responses A, B or C as long as the selector guide bar remains in its raised position. When the selector guide bar is released, the shutter will return to its original closed-view position as heretofore described.

Figure 12:
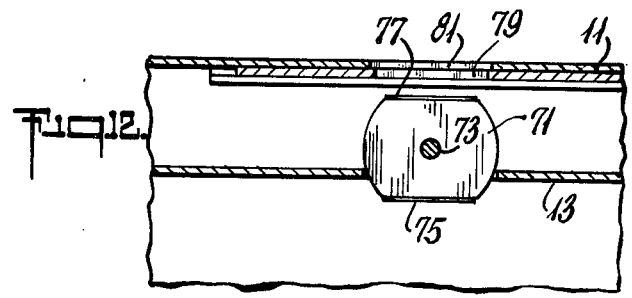
FIG. 12 is a top view of a section of the device showing a different embodiment of the invention.

In the embodiment illustrated in FIG. 12, a disc 71 is rotatably mounted on an axial pin 73. The disc 71 has its peripheral surface flattened out at two opposite sections 75 and 77 so that when the disc is rotated in a clockwise or counterclockwise direction, either one of said surfaces can be aligned with the shutter 79 while the other opposite surface faces the student side. These surfaces may be labelled so that when the shutter 79 is opened (as in the embodiments illustrated in FIGS. 1–10) the response can be viewed through the viewing area 81.

While the present invention has heretofore been described with a certain degree of particularity, it is evident from the disclosure herein that several changes and/or modifications may be made therein which are obvious from the foregoing detailed description. For example, instead of using "yes" "no" labels, colors may be employed to indicate one or more responses. Also, two shutters or two selectors, (e.g., disc-shaped members) may be used instead of one as illustrated in the drawings with each selector bearing two or more response labels. The shutter employed with this and other embodiments may be modified to work on the same principle as the selectors shown in FIGS. 1 or 7 where the disc-shaped member has affixed to its curved surface a rectangular section of sufficient length to obscure other selectors' faces in the viewing aperture. Depressing the lever in the student panel lifts the shutter by rotating it upward, while raising it brings the shutter into the viewing aperture so as to obscure any selected answer. One or more of these may be employed in a single modular unit. These changes and modifications are within the scope of this disclosure.

What is claimed is:

1. A modular response unit for use in educational institutions comprising:
   (a) a relatively flat base and a pair of opposed, parallel side walls upstanding from said base,
   (b) a housing defined by a first panel and a second panel in spaced, parallel relation to said first panel, a top panel and parts of said base and side walls, said first panel and said second panel facing the student and instructor, respectively,
   (c) a generally rectangular cutout area in said first panel and a rotatable disc-shaped member mounted in said rectangular cutout area, said disc-shaped member bearing one or more indicia,
   (d) a cutout viewing area in said second panel for viewing each of said indicia on said disc-shaped member when said disc-shaped member is rotated to register one of said indicia with said viewing area,
   (e) a horizontal slot in said first panel,
   (f) shutter means for opening and closing said viewing area, and
   (g) means in said horizontal slot operably connected to said shutter means for opening and closing said shutter means.

2. A modular response unit as in claim 1 wherein said disc-shaped member has a cutout portion shaped to form a pair of lateral projections; an upper projection and a lower projection, so that when said disc-shaped member is rotated clockwise, said upper projection abuts said first panel thereby restricting further rotation of said disc-shaped member to register one of said indicia with said viewing area, and when said disc-shaped member is rotated counterclockwise, said lower projection abuts said first panel thereby restricting further rotation of said disc-shaped member to register the other of said indicia with said viewing area.

3. A modular response unit as in claim 1 wherein said means connected to said shutter means is a lever.

4. A modular response unit as in claim 2 wherein said means connected to said shutter means is a lever.

5. A modular response unit as in claim 1 wherein a tally counter is mounted on said second panel, said tally counter comprising a circular member bearing several digital indicia and a central means for rotating said circular member.

6. A modular response unit as in claim 2 wherein a tally counter is mounted on said second panel, said tally counter comprising a circular member bearing several digital indicia and a central means for rotating said circular member.

7. A modular response unit as in claim 3 wherein a tally counter is mounted on said second panel, said tally counter comprising a circular member bearing several digital indicia and a central means for rotating said circular member.

8. A modular response unit as in claim 4 wherein a tally counter is mounted on said second panel, said tally counter comprising a circular member bearing several digital indicia and a central means for rotating said circular member.

9. A modular response unit as in claim 1 wherein said rotatable member mounted in said first panel is a generally himispherical, indicia-bearing member having an integral lever for rotating said member to register each of said indicia with said viewing area.

10. A modular response unit as in claim 2 wherein said rotatable member mounted in said first panel is a generally hemispherical, indicia-bearing member having an integral lever for rotating said member to register each of said indicia with said viewing area.

11. A modular response unit as in claim 3 wherein said rotatable member mounted in said first panel is a generally hemispherical, indicia-bearing member having an integral lever for rotating said member to register each of said indicia with said viewing area.

12. A modular response unit as in claim 4 wherein said rotatable member mounted in said first panel is a generally hemispherical, indicia-bearing member having an integral lever for rotating said member to register each of said indicia with said viewing area.

13. A modular response unit for use in educational institutions comprising:
   (a) a relatively flat base and a pair of opposed, parallel side walls upstanding from said base, (b) a housing defined by a first panel and a second panel in spaced, parallel relation to said first panel, a top panel and parts of said base and side walls, said first panel and said second panel facing the student and instructor, respectively, (c) a generally rectangular cutout area in said first panel, a pair of opposed parallel side bars secured to the longitudinal sides of said cutout area, each of said side bars having a longitudinal channel in facing relation to each other, (d) a relatively flat, indicia-bearing bar slideably mounted in said channels between said side bars, (e) a cutout viewing area in said second panel for viewing each of said indicia when said indicia is in register with said viewing area, (f) a horizontal slot in said first panel, (g) shutter means for opening and closing said viewing area, and (h) means in said horizontal slot operably connected to said shutter means for opening and closing said shutter means.

14. A modular response unit as in claim 13 wherein said means connected to said shutter means is a lever.

15. A modular response unit for use in educational institutions comprising:

(a) a relatively flat base and a pair of opposed, parallel side walls upstanding from said base, (b) a housing defined by a first panel and a second panel in spaced, parallel relation to said first panel, a top panel and parts of said base and side walls, said first panel and said second panel facing the student and instructor, respectively, (c) a generally rectangular cutout area in said first panel, a pair of opposed parallel side bars secured to the longitudinal sides of said cutout area, each of said side bars having a longitudinal channel in facing relation to each other, (d) a relatively flat, indicia-bearing bar slideably mounted in said channels between said side bars, (e) a cutout viewing area in said second panel for viewing each of said indicia when said indicia is in register with said viewing area, (f) a horizontal slot in said first panel, (g) shutter means for opening and closing said viewing area, (h) spring means attached at each end of said indicia-bearing bar for biasing said bar upward or downward, (i) a string trained over a set of pulleys in said housing, said string being connected to each of said spring means and to said shutter means to open and close said shutter means when said bar is biased upward or downward, and (j) tension means secured to said shutter means and said housing for retaining said shutter means in closed position when said spring means are in their normal unbiased position.

16. A modular response unit for use in educational institutions comprising:

(a) a relatively flat base and a pair of opposed, parallel side walls upstanding therefrom, (b) a housing defined by a first panel and a second panel in spaced, parallel relation to said first panel, a top panel and parts of said base and side walls, said first panel and said second panel facing the student and instructor, respectively, (c) a cutout area in said first panel and a cutout viewing area in said second panel, (d) a disc-shaped member adapted to rotate in the horizontal plane and partially mounted within said housing, said disc-shaped member having opposed, flattened, indicia-bearing peripheral surfaces, such that when one of said surfaces is in register with said viewing area, the other surface is in facing relation to the student, and (e) shutter means operable to close and open said viewing area.

17. A modular response unit as in claim 16 wherein said disc-shaped member is rotatably mounted on an axial pin.

* * * * *